Patented July 11, 1950

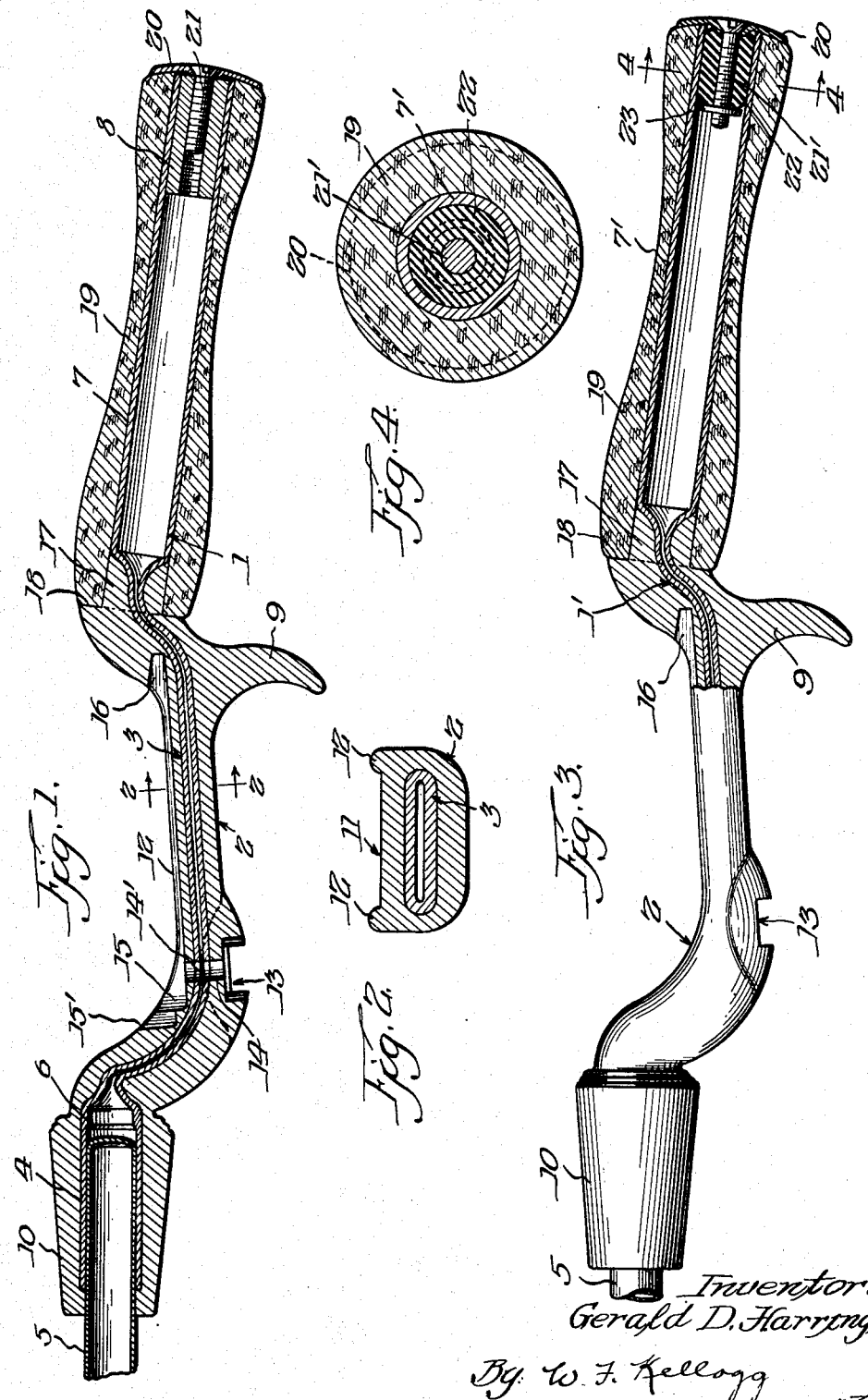

2,514,950

UNITED STATES PATENT OFFICE 2,514,950

FISHING ROD HANDLE

Gerald Dale Harrington, Kalamazoo, Mich., assignor to Shakespeare Company, Kalamazoo, Mich., a corporation of Michigan Application August 20, 1945, Serial No. 611,509

2 Claims. (Cl. 43—23)

This invention relates to improvements in fishing rod handles, and has for one of its objects to provide a metal-plastic fabricated fishing rod handle of light though unusually sturdy construction, capable of being produced at a minimum of cost.

It is another object of the invention to provide a fishing rod handle so constructed as to prevent corroding, eroding, and/or other deterioration of the exposed surfaces thereof; hence, prolonging the period of efficient and satisfactory usage of the handle.

The invention also aims to provide a fishing rod handle to which various aesthetic, embellishing, and utilitarian colors, finishes and/or combinations thereof may be imparted and substantially permanently maintained, the same being effectually resistant to or proof against deterioration, as by the action of water, atmospheric or weather conditions to which it, during both use and non-use, will be subjected.

Yet another object of the invention is to provide a fishing rod handle constructed of metal and plastic, wherein the metal and plastic components thereof are so constructed and relatively disposed that the functions of each are interdependent and combine to produce a device possessed of a maximum of inherent compression and tensile strength and resistance qualities; thus, rendering it extremely durable and rugged, and entirely capable of most successfully withstanding the rigors and exigencies of normal and abnormal usage.

A still further object of the invention is to provide a novel form of light and strong metal reinforce or core for an improved handle, capable of economical and mass production from more or less standard characters of stock materials, and of imparting ample reinforcement to the completed product, plus the provision of means for facilitating connection of a rod butt end thereto.

Other objects of the invention will be in part obvious and in part pointed out hereinafter.

In order that the invention and its mode of operation may be readily understood by those skilled in the art to which it appertains, I have in the accompanying drawings and in the following detailed description based thereupon, set out several embodiments of my invention.

In the drawings:

Figure 1 is a longitudinal section through a fishing rod handle constructed in accordance with my invention, and wherein the butt end portion of a rod is fragmentally shown and received thereby.

Figure 2 is an enlarged transverse section taken on the line 2—2 of Figure 1, looking in the direction in which the arrows point.

Figure 3 is a side elevation of the improved rod handle with the finger and hand grip portions thereof shown in section, whereby to illustrate more clearly the provision of a removable butt plate or cap to the handle grip; and Figure 4 is an enlarged transverse section taken on the line 4—4 of Figure 3, looking in the direction in which the arrows point.

Referring specifically to the drawings, I have illustrated the invention adapted to a casting type of fishing rod handle, generally comprising a partially tubular metal reinforce body 1 and a plastic body 2 partially encasing the same, which latter is molded or otherwise suitably formed from satisfactorily durable, and resistant material.

The reinforce body 1 consists of a suitable length of tubular metal stock of desired cross-sectional area and shape. An intermediate portion of the body is flattened and axially offset, as at 3, to provide a substantially U-shaped member. Its forward tubular end portion 4, of appropriate length, affords a socket fitting for snugly receiving and removably retaining therein the adjacent or butt-end of a fishing rod 5 and, preferably, is formed with an internal annular shoulder 6, in its basal end, for an obvious purpose.

The rearward tubular end portion 7 of the reinforce body 1 is adapted to serve as a grip or handle receiving and supporting means, and, manifestly, is of a length as will satisfy such usage. I also prefer that this portion 7 shall be disposed at an angle of approximately ten degrees (10°) with relation to the forward tubular end portion 4 and the bottom or base of the laterally offset portion 3 thereof. Such angling of the portion 7 affords a most advantageous positioning of a user's hand, when grasping the finished rod handle, in that it materially facilitates accurate line and lure casting with a minimum of effort and wrist fatigue, and additionally, permits of positioning of the user's thumb in relationship to an attached and supported reel (not shown) whereby the ball of the thumb can be comfortably and effectually employed for line thumbing, as more fully disclosed in the United States Letters Patent to William O. Balz and Earle D. Clickner, No. 2,260,204, issued October 21, 1941.

An internally screw-threaded sleeve 8, or its equivalent, is fixedly received in the open rearward end of the tubular portion 7, i. e., the grip or handle receiving and supporting member, and permits the securing of a butt plate (hereinafter described) thereto.

The aforesaid plastic body 2, as will be noted, encases the offset U-shaped portion 3, the forward tubular end portion 4 and a slight portion of the tubular rearward end portion 7, as well shown in Figures 1 and 2 of the drawings. The depth or thickness of the plastic material or body 2, as will be seen upon reference to Figure 1, is so regulated as to impart form or shape to the improved fishing rod handle. Moreover, a usual fingergrip 9, is formed thereby and, of course, is located adjacent the normally rearward end of the bottom of the U-shaped portion 3 of the metal reinforce body 1 adjacent the rod handle, hereinafter more specifically described.

That portion of the plastic body 2 about the tubular forward end portion 4 of the reinforce body 1, indicated at 10, is preferably of cross-sectionally circular shape and also, is outwardly tapered for both aesthetic and utilitarian purposes.

At and near its point of jointure with the inner end of the portion 10, the plastic body is preferably somewhat thicker than the remaining and rearward portion of the same, though it generally follows the curvature and outline of the offset part 2 encased or sheated thereby, as will be seen upon reference to Figure 1.

The plastic material encasing the bottom part of the offset U-shaped portion 3 is formed to provide a flat or plane upper surface 11 longitudinally beaded or flanged, as at 12, along its opposite sides, as will be noted upon reference to Figure 2. The lower side of this particular portion of the plastic body is formed with a pocket or recess 13 and a communicating transverse opening 14 aligning with a correspondingly sized opening 14' formed in an adjacent portion of the reinforce body U-shaped part 3, whereby to receive the usual finger engageable head of a reel cross plate engaging and securing screw (not shown).

To permit satisfactory seating and securing of a reel upon and to the flattened upper side 11 of the rod handle offset, the forward portion of the plastic material is formed with relatively stepped recesses 15 and 15', while its rearward portion is formed with an inwardly disposed or undercut way 16. Thus, a reel to be seated and secured upon this flattened portion 11 of the plastic body, will have its cross plate brought to bear thereupon with one end of such cross plate engaged in the undercut way 16 and its opposite end in the recess 15, whereupon the usual clamping element is engaged over the latter mentioned end of such cross plate and in the stepped recess 15', at which time, the usual locking screw is engaged through the aligned openings 14 and 14' of the plastic body 2 and the reinforce body 1 into connecting engagement with the clamping element. Obviously, lateral displacement of the reel cross plate with respect to the bottom of the rod handle offset will be prevented by the beading of flanges 12.

As hereinbefore stated, the plastic material constituting the body 2 encases the rearward portion of the offset 3 of the reinforce body 1, and also, the near portion of the grip receiving and supporting tubular end 7. Such plastic, at this particular point, is preferably thickened to impart the necessary body and strength to the plastic body, and is formed to provide a rearwardly extending cross-sectionally circular shank or end 17, annularly shouldered as at 18. The cross-sectional shape and size of said end 17, as will be noted upon reference to Figure 1 of the drawings, substantially corresponds to that of the member 7.

A sleeve-like and appropriately shaped grip or handle 19, made of cork, plastic, rubber, wood, etc., is received upon and about the rearward end portion or member 7 throughout its length and, as shown in Figure 1, abuttingly engages the shouldered portion 18 of the adjacent portion of the plastic body 2. To secure the grip 19 against displacement with relation to the member 7, a butt plate 20 is engaged over its rearward end and is secured to said member 7 by turning a locking screw 21 through the butt plate into engagement with the internal screw threads of the sleeve 8.

At this point, it may be noted that the flattened axially offset portion 3 of the reinforce body 1 is so formed as to provide a slight spacing between its opposite sides. Because of this spacing, it will be appreciated that the fabricated metal-plastic construction will be permitted to automatically compensate for such variations as may be caused by expansion and contraction, due to temperature changes.

In Figures 3 and 4 of the drawings, I have shown a modified adaptation of butt plate for usage in connection with my improved fishing rod handle. This modified type of butt plate, instead of being permanently attached or secured to the handle or grip receiving and supporting portion 7' of the metal reinforce body 1', is detachable therefrom. To such end, a resilient frictional gripping sleeve 22 is engaged over and along the shank portion of the butt plate screw 21' and is maintained against displacement therefrom by a locking nut 23, or its equivalent. The cross-sectional shape and size of the resilient sleeve 22 is such that it will have snug frictional engagement within the near end portion of the tubular handle or grip receiving and supporting member 7'. In consequence, when inserted into said member 7', undesired disengagement therefrom will be prevented. Thus, the interior of the tubular member 7' affords a most convenient receptacle into which various articles may be placed for safekeeping, such, for example, as a fisherman's licence, etc.

It is manifest that certain other changes and/or modifications of the arrangements and constructions herein disclosed, are well within the province of the teachings of the invention hereinbefore described. I, therefore, do not intend that the herein made disclosures, either by descriptive matter or drawings, shall or should be construed as limiting the ambit of my invention to any extent, save that which is within the scope of and inventive spirit expressed by the hereto appended claims.

I claim:

1. A composite metal-plastic fishing rod handle, comprising a single piece of tubular metal of closed formation throughout its entire length and having its opposite ends open, an intermediate portion of said piece being axially offset and substantially U-shaped, said offset and U-shaped portion being flattened throughout its length, the outer end portions of the leg portions of the U-shaped flattened intermediate portion being outwardly disposed, the outer and opposite end portions of said single tubular piece being substantially straight and contiguous with the extremities of said outwardly disposed outer end portions of the leg portions and extended beyond the same, and a plastic covering about and over the entire U-shaped flattened intermediate portion including the outwardly disposed outer end portions of the leg portions thereof and about and over one of said opposite tubular end portions of said single piece.

2. A composite metal-plastic fishing rod handle, comprising a single piece of tubular metal of closed formation throughout its entire length and having its opposite ends open, an intermediate portion of said piece being axially offset and substantially U-shaped, said offset and U-shaped portion being flattened throughout its length, and the flattened portion being arranged in juxtaposed parallel relation throughout the length of the same, the outer end portions of the leg portions of the U-shaped flattened intermediate portion being outwardly disposed, the outer and opposite end portions of said single tubular piece being substantially straight and contiguous with the extremities of said outwardly disposed outer end portions of the leg portions and extended beyond the same, and a plastic covering about and over the entire U-shaped flattened intermediate portion including the outwardly disposed outer end portions of the leg portions thereof and about and over one of the opposite tubular end portions of said single piece, the remaining end of said plastic covering being formed to be contiguous with the inner end portion of the remaining opposite tubular end portion of said single piece.

GERALD DALE HARRINGTON.

REFERENCES CITED

The following references are of record in the file of this patent:

UNITED STATES PATENTS

| Number | Name | Date |
| --- | --- | --- |
| 673,772 | Hall | May 7, 1901 |
| 1,923,035 | Hoerle et al. | Aug. 15, 1933 |
| 1,990,957 | Ridges | Feb. 12, 1935 |
| 2,194,639 | Cole | Mar. 26, 1940 |
| 2,205,769 | Sweetland | June 25, 1940 |
| 2,252,054 | Welch | Aug. 12, 1941 |
| 2,260,204 | Balz et al. | Oct. 21, 1941 |
| 2,379,578 | Heddon | July 3, 1945 |